United States Patent [19]
Krickl et al.

[11] Patent Number: 5,261,693
[45] Date of Patent: Nov. 16, 1993

[54] GAS BAG RESTRAINING SYSTEM ASSEMBLY

[75] Inventors: Rudi Krickl, Schwäbisch Gmünd-Wustenried; Hans Kissendorfer, Günzburg; Dominique Acker, Alfdorf, all of Fed. Rep. of Germany

[73] Assignee: TRW Repa GmbH, Alfdorf, Fed. Rep. of Germany

[21] Appl. No.: 911,969

[22] Filed: Jul. 10, 1992

[30] Foreign Application Priority Data

Aug. 20, 1991 [DE] Fed. Rep. of Germany ....... 9110293

[51] Int. Cl.⁵ .............................................. B60R 21/20
[52] U.S. Cl. ................................. 280/732; 280/728; 403/391
[58] Field of Search .............. 280/732, 728 R, 728 A, 280/728 B, 743 R; 403/391, 389, 384, 217

[56] References Cited

U.S. PATENT DOCUMENTS

| | | | |
|---|---|---|---|
| 4,770,439 | 9/1988 | Maier et al. | 280/732 |
| 4,913,461 | 4/1990 | Cuevas | 280/731 |
| 5,092,627 | 3/1992 | Igawa | 280/728 |
| 5,118,133 | 6/1992 | Zushi et al. | 280/728 |
| 5,186,492 | 2/1993 | Wright et al. | 280/743 |

FOREIGN PATENT DOCUMENTS

| | | | |
|---|---|---|---|
| 0235383 | 12/1986 | European Pat. Off. | |
| 0404302 | 4/1990 | European Pat. Off. | |
| 7540488 | 4/1976 | Fed. Rep. of Germany | |
| 4026440 | 2/1991 | Fed. Rep. of Germany | |
| 9014749.9 | 3/1991 | Fed. Rep. of Germany | |
| 4040041 | 6/1991 | Fed. Rep. of Germany | |
| 2-310142 | 12/1990 | Japan | 280/728 A |
| 4-55143 | 2/1992 | Japan | 280/728 A |

*Primary Examiner*—Eric D. Culbreth
*Attorney, Agent, or Firm*—Tarolli, Sundheim & Covell

[57] ABSTRACT

A gas bag assembly in a gas bag restraining system has four elongated bars (2,4,6,8) of identical profile material which each have along their length a first (34) and a second groove (18) with a generally hollow cross-section, and a quadrangular base plate (10) which is provided with openings (14) for receiving at least one gas generator (20) and which has three edges (52,54,56) each engaged in the first groove (34) of one of said elongated bars (2,4,6,8) and a fourth edge (30) secured to another one of said bars. The gas bag (44) has an inlet opening (46) bordered by four tubular sections (42) shaped for accommodation in the second groove (18) of one of said elongated bars. A rod (40) is inserted into each of the tubular sections (42) for retaining the tubular section in the second groove (18) of the respective elongated bar.

7 Claims, 3 Drawing Sheets

GAS BAG RESTRAINING SYSTEM ASSEMBLY

BACKGROUND OF THE INVENTION

The invention relates to a gas bag restraining system assembly.

A gas bag restraining system in a vehicle includes among other things a gas bag and at least one gas generator which are in connection with each other. For example the border of the inlet opening of the gas bag is connected via screw or rivet connections to a housing which also accommodates at least one gas generator. These connections are very complicated to form because they must withstand high mechanical loads and be largely gas-tight. Because of the large number of necessary screw or rivet connections, the latter always also represent a possible fault potential.

Furthermore, the components of a restraining system must be adapted in optimum manner to each other and to the conditions in the vehicle, and consequently the entire assembly must be designed for each individual use, thus hitherto making impossible economic production, in particular of relatively small numbers.

SUMMARY OF THE INVENTION

The invention provides an assembly of a gas bag restraining system which satisfies high demands as regards mechanical loadability and gas tightness and which is economical to make even in relatively small numbers and is simple to install.

This is achieved according to the invention in a gas bag restraining system assembly by four elongated bars of identical profile material which each have along their length at least a first and a second groove, the cross-section of which is inwardly widened and/or curved, a quadrangular base plate which is provided with openings for receiving at least one gas generator and of which three edges are each formed for being received in an interlocking manner in the first groove of a bar and a fourth edge is secured to the fourth bar, a border of the inlet opening of the gas bag along the periphery of which four tubular portions are consecutively formed for accommodation in the second groove of a bar, and four rods which are inserted into a respective one of the tubular portions for inter-locking securing thereof in the second groove of the respective bar. A large number of screw or rivet connections, always representing a certain safety risk, are eliminated. To assemble the gas bag it is merely necessary to insert some bars and strips into each other. The bars at least can be standardized for numerous applications, making production more economical.

If each bar has a third groove and the third grooves of two opposing bars are each formed for inter-locking connection to a vehicle mounting lug, the assembly can be mounted in simple manner in the vehicle.

At the same time, the third grooves of two opposing bars can hold a simply mountable gas bag cover if a respective mounting strip at the edge of the gas bag cover engages in inter-locking manner in the latter.

Embodiments of the components each provided with a groove for inter-locking which are particularly simple to make and assemble are set forth herein.

Slipping of the components out of the grooves can be made difficult by play-free fitting or impossible if the bars are mitred and form a closed frame around the base plate.

BRIEF DESCRIPTION OF THE DRAWINGS

Further features and advantages of the invention will be apparent from the following description of a preferred embodiment and from the drawings, to which reference is made.

DESCRIPTION OF PREFERRED EMBODIMENTS

Figure 1:
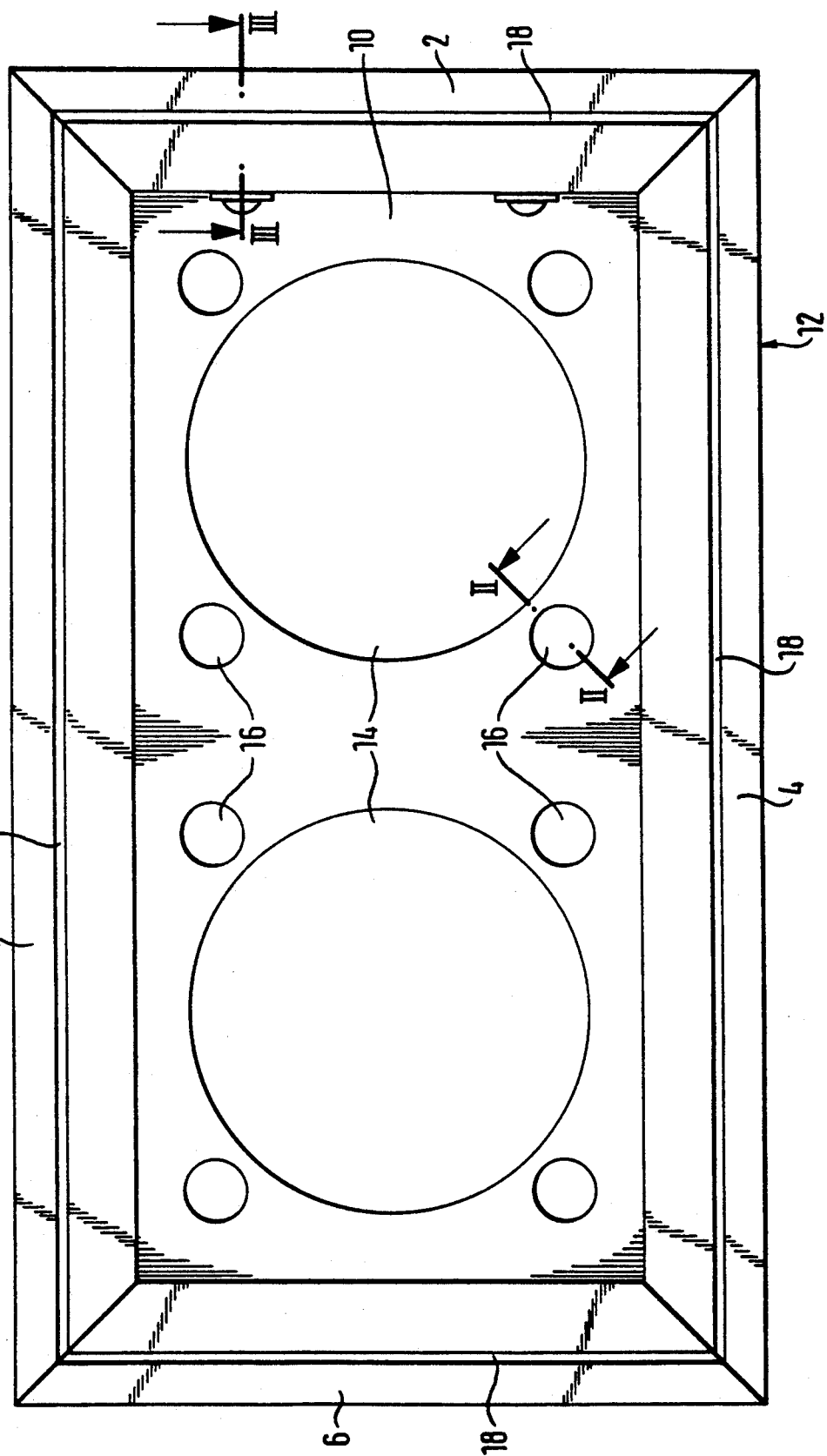
FIG. 1 shows a plan view of a base plate with strips.

In FIG. 1, four bars 2, 4, 6 and 8 are secured to the periphery of a quadrangular base plate 10. The bars 2, 4, 6 and 8 are mitred at their ends so that they form a closed frame 12 around the base plate 10. Along the bars 2, 4, 6 and 8 and the frame 12 several grooves extend, only one 18 of which is visible, serving to secure a gas bag which is not illustrated and is to be arranged in the Figure above the base plate. In the base plate 10 two installation openings 14 and eight mounting bores 16 are formed for two gas generators.

Figure 2:
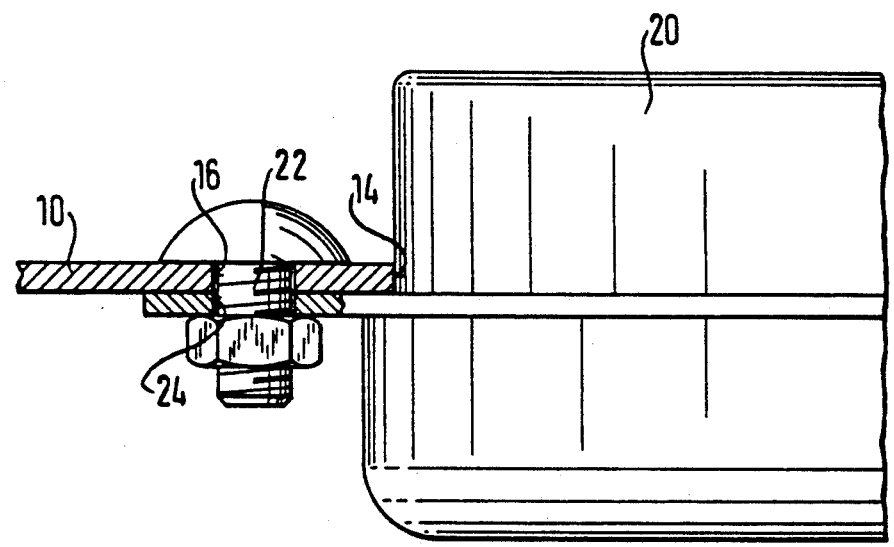
FIG. 2 is a section along a line II—II of FIG. 1 and shows the mounting of a gas generator.

In FIG. 2, a gas generator 20, only partially visible, is accommodated in one of the installation openings 14. A bolt 22 extends in each case through one of the mounting bores 16 and through one of a plurality of bores 24 in the gas generator 20.

Figure 3:
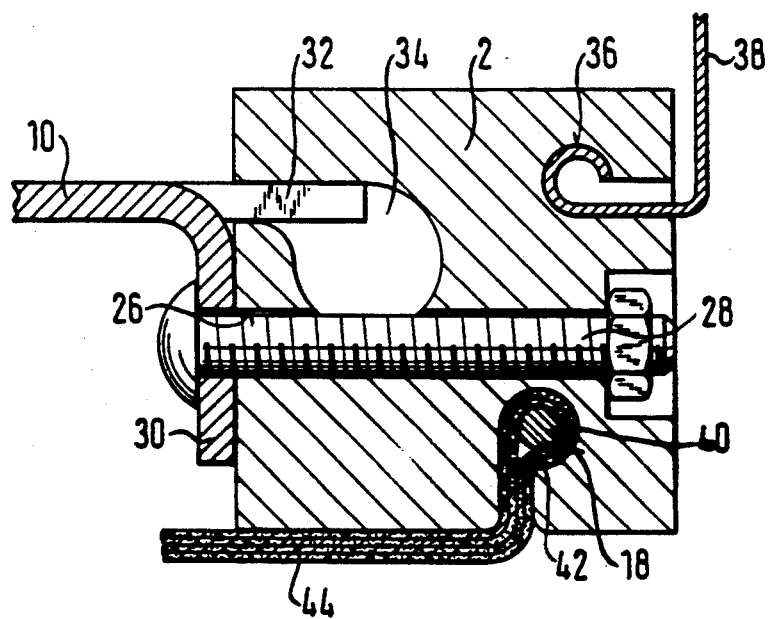
FIG. 3 is a section through a strip along a line III—III of FIG. 1 viewed from the upper leaf edge.

According to FIG. 3, the bar 2 is screwed by means of bolts 28 projecting through bores 26 in said bar 2 to an angled edge 30 at one side of the base plate 10. A projecting portion 32 of the base plate 10 extends into a groove 34 of inwardly widened cross-section in the bar 2. The projecting portion 32 assists the taking up of the large forces liberated on ignition of the gas generators. A groove 36 in the bar 2 is likewise inwardly widened in cross-section and receives an end of a vehicle mounting lug 38 which is bent for inter-locking with the groove 36 and the other end of which can be connected in a manner not shown to a vehicle bodywork. The groove 18 can also be seen and is likewise widened inwardly in cross-section. A rod 40 extends perpendicularly to the plane of the Figure through a tubular portion 42 of a gas bag 44, only partially visible, and is received together with the tubular portion 42 in inter-locking manner in the groove 18.

The other three bars 4, 6 and 8 are identical to the bar 2 in cross-section but do not have any bores 26. The bars 4, 6 and 8 are secured to the base plate 10 in that a portion corresponding to the projecting portion 32 projects still further at a respective side of the base plate 10 and is curved to fit in inter-locking manner in the groove 34 within the latter, corresponding to the inter-locking reception of the end of the vehicle mounting lug 38 in the groove 36.

Figure 4:
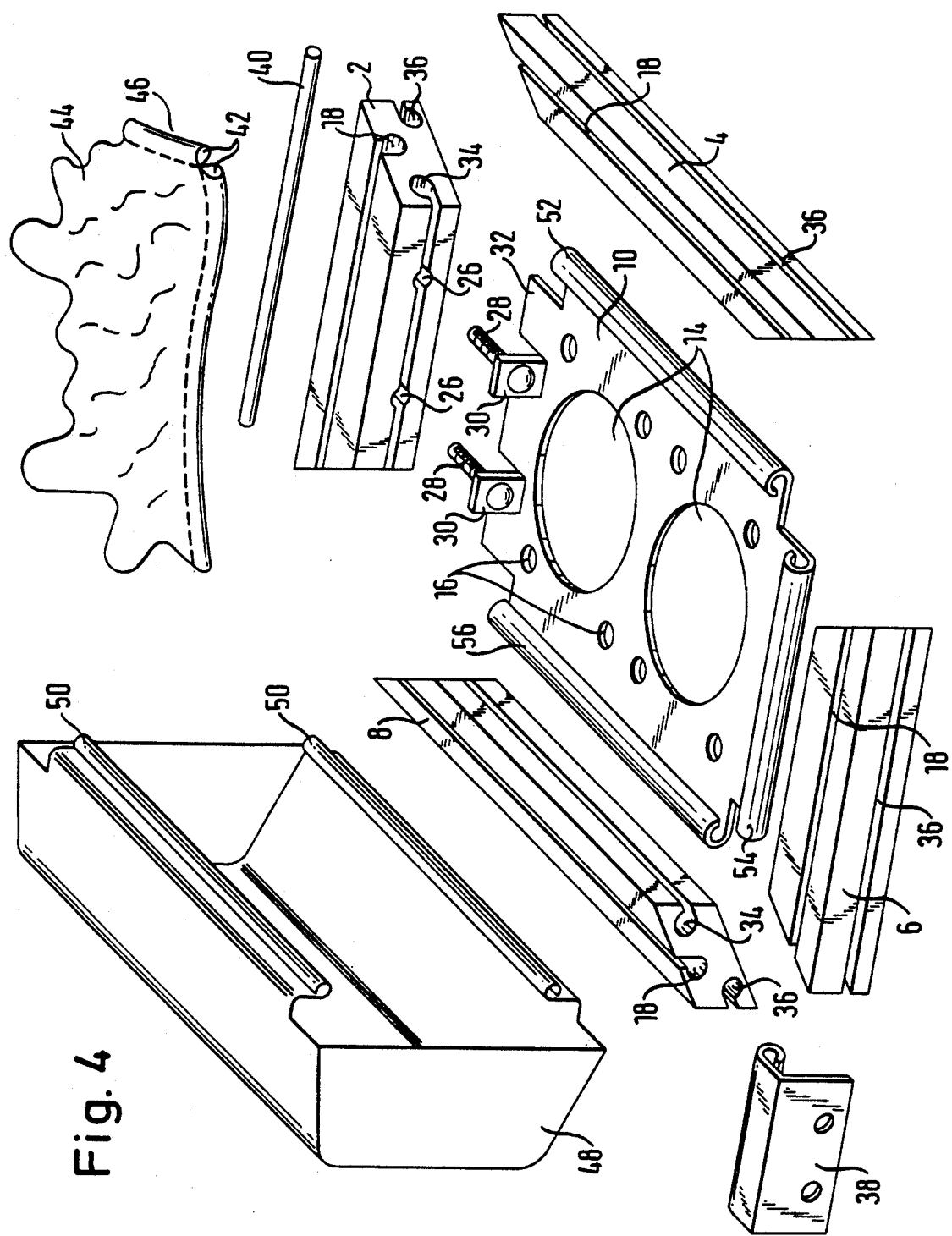
FIG. 4 is an exploded illustration of the assembly.

Any parts shown in FIG. 4 already mentioned in connection with the other Figures have been denoted by the same reference numerals. The gas bag 44 has four tubular portions 42 which are formed for example by sewing over the gas bag material and define a rectangular inlet opening 46 of the gas bag 44. Furthermore, a gas bag cover 48 can be seen, the edge of which is bent over in the manner already described in conjunction with the vehicle mounting lug 38 to form two mounting strips 50 so that said mounting strips 50 are configured for inter-locking to the grooves 38 in the bars 4 and 8.

The base plate 10 comprises three edges 52, 54, and 56 each bent over for inter-locking to one of the grooves 34.

Mounting of the assembly is for example carried out in that the gas bag 44 is folded and inserted into the gas bag cover 48. Two gas generators 22 are introduced into the installation openings 14 and screwed to the base plate 10 through the mounting bores 16. The bars 4 and 8 are pushed from one side with their grooves 36 over the mounting strips 50 and with their grooves 18 over two tubular portions 42 of the gas bag 44. Before or after the last operation described, to establish the inter-locking, rods 40 are inserted from one side into the portions 42 of the gas bag belonging to the bars 4 and 8. A respective vehicle mounting lug 38, only one of which is illustrated, is inserted into each of the grooves 36 of the bars 2 and 6. The bar 6 is pushed with its groove 34, not shown in the Figure, onto the edge 54 of the base plate 10 and said base plate 10 is inserted with its edges 52 and 56 into the grooves 34 of the bars 4 and 8, and before engagement of the ends of the bars 4 and 6 or 8 and 6 with each other inter-locking between the groove 18 of the bar 6 and a corresponding tubular portion 42 of the gas bag 44 is established with a rod 12. The bar 2 is likewise connected by a rod 12 in inter-locking manner to the tubular portion 42 of the gas bag 44 corresponding thereto and screwed by means of the bolts 28 to the edge 30 of the base plate 10. The mitred bars 2, 4, 6 and 8 secure the rods 12, the gas bag cover 48 and the vehicle mounting lugs 38 from falling out.

The assembly forms an extremely strong connection in particular between the base plate 10 and the gas bag 44, between which large forces act. At the same time, it consists only of a few components which in addition are relatively easy and quick to assemble. Since prior to assembling the remaining components of the assembly the gas bag 44 can be folded and inserted into the gas bag cover 48, there is no danger of said bag being damaged or squashed on assembly. Due to the configuration of the bars the gas bag 44 automatically maintains a certain distance from the gas generators 20 so that thermal stresses of the gas bag fabric are reduced. One and the same profile or section material may be used for numerous designs of the gas bag restraining system and consequently a modular system is implemented which permits economic production even of small numbers.

We claim:

1. A gas bag assembly in a gas bag restraining system having at least one gas bag and one gas generator, having four elongated bars of identical profile material which each have along their length a first and a second groove with a generally hollow cross-section, a quadrangular base plate which is provided with openings for receiving at least one gas generator and which has three edges each engaged in the first groove of one of said elongated bars and a fourth edge secured to another one of said bars, said gas bag having an inlet opening bordered by four tubular sections shaped for accommodation in the second groove of one of said elongated bars, and four rods which are inserted into a respective one of the tubular sections for retaining said tubular section in the second groove of the respective elongated bar.

2. The assembly according to claim 1, wherein each bar comprises a third groove and wherein the third grooves of two opposed bars are each formed for insertion of an edge of a vehicle mounting lug.

3. The assembly according to claim 2 comprising a gas bag cover provided with a pair of mounting strips along two opposed edges, said mounting strips being inserted into the third grooves of two opposed elongated bars.

4. The assembly according to claim 3, wherein each of said mounting strips is formed by bending over an edge of the gas bag cover.

5. The assembly according to claim 2, wherein said vehicle mounting lugs are bent over on one side for fitting engagement in the third groove.

6. The assembly according to claim 1, wherein said bars are mitred and form a closed frame around the base plate.

7. The assembly according to claim 1, wherein the base plate is made of a material, and said edges of the base plate are formed by bending over the base plate material.

* * * * *